May 25, 1954 — T. J. CLAYDON ET AL — 2,679,158
DOUBLE STAGE SEDIMENT TESTER
Filed Jan. 16, 1951 — 2 Sheets-Sheet 1
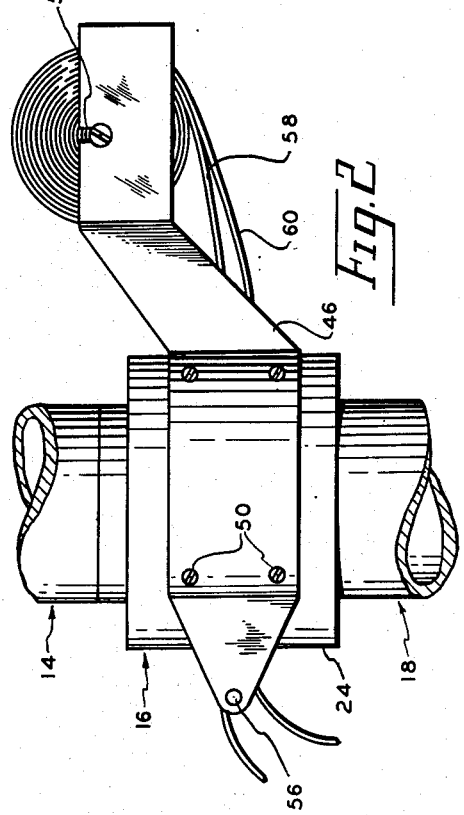
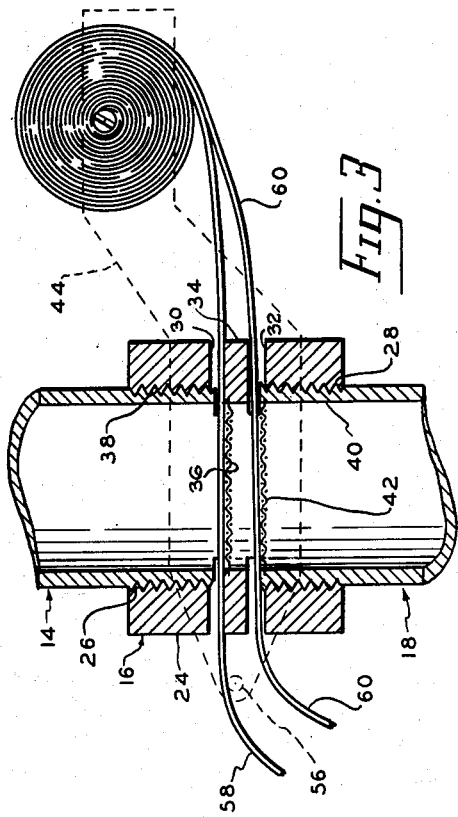
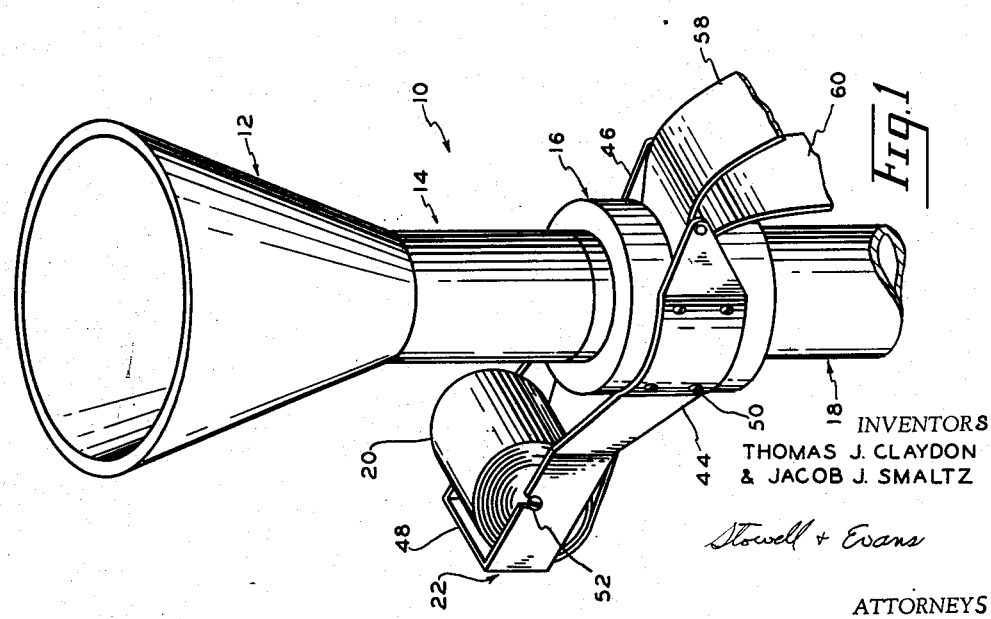
INVENTORS
THOMAS J. CLAYDON
& JACOB J. SMALTZ
Stowell + Evans
ATTORNEYS May 25, 1954     T. J. CLAYDON ET AL     2,679,158
DOUBLE STAGE SEDIMENT TESTER
Filed Jan. 16, 1951     2 Sheets-Sheet 2
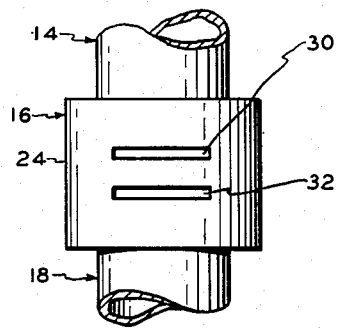
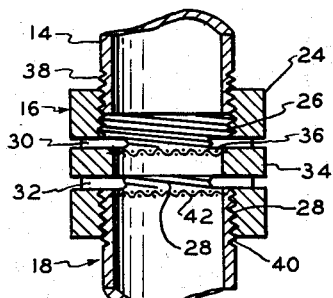
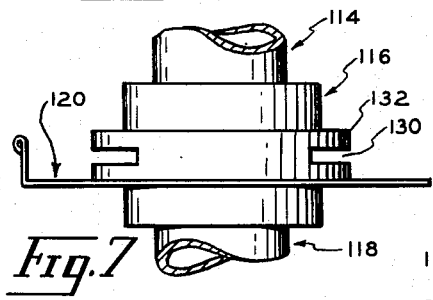
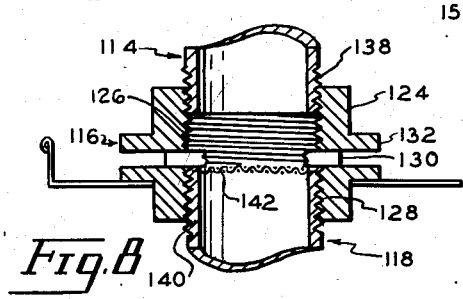
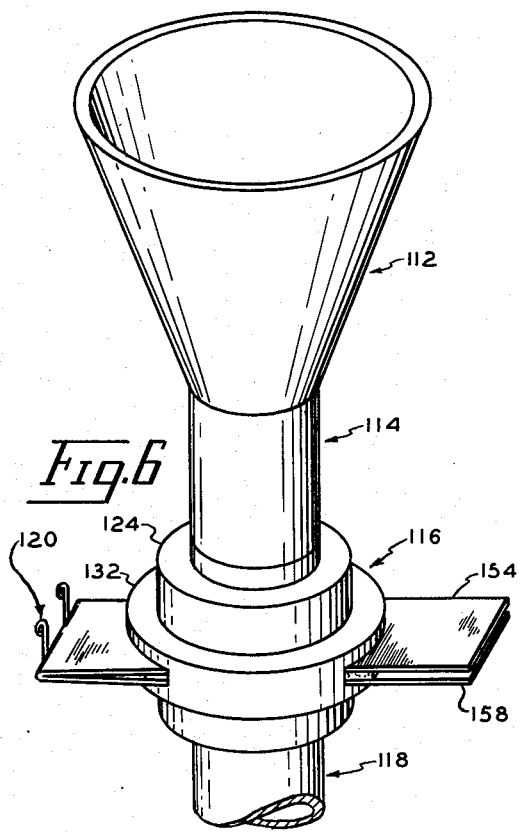
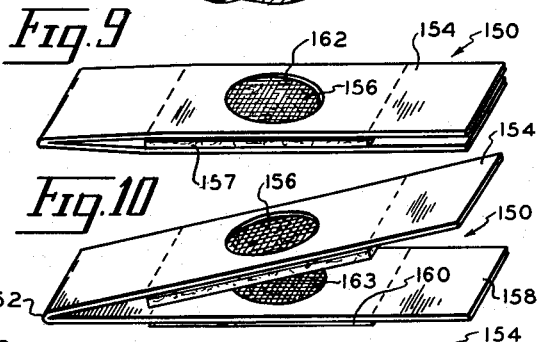
INVENTORS.
THOMAS J. CLAYDON &
JACOB J. SMALTZ
BY Stowell + Evans
ATTORNEYS Patented May 25, 1954

2,679,158

UNITED STATES PATENT OFFICE 2,679,158

DOUBLE STAGE SEDIMENT TESTER

Thomas J. Claydon and Jacob J. Smaltz, Manhattan, Kans., assignors to Research Corporation, New York, N. Y., a corporation of New York Application January 16, 1951, Serial No. 206,265

3 Claims. (Cl. 73—61)

This invention relates to filters and in particular to an improvement in double stage filters.

It is the principal object of the invention to provide a double stage filter for sediment testers.

In many of the food industries, the testing of raw materials for extraneous materials as a measure of quality has become almost mandatory.

This is particularly true in the dairy industry wherein sediment testing of raw milk and cream from many individual producers is necessary before processing of the dairy products can begin. While the sediment testing of milk and cream generally does not present any marked difficulty, this is not the case with sour cream and some finished dairy products, such as for example, cheese and ice cream. Even after treatment of such materials with suitable reagents to put the bulk of the material into solution, considerable difficulties are experienced. This slows down plants handling and manufacturing such products and discourages adequate sediment testing procedures.

It is, therefore, one of the objects of the present invention to provide a double stage sediment tester including a relatively coarse filter element to remove larger particles, such as curds and slime, and a second standard filter element. We have found that this improvement gives much more rapid filtering of the materials to be tested and also permits the satisfactory testing of many materials that fail to pass through the usual sediment tester, even when a vacuum or air pressure is employed to expedite filtration.

A further object is to provide such a filter employing means for readily removing and changing the filter medium in order to examine the nature of the extraneous material collected on the filters.

We have further found that through the use of double stage filtration, it is possible to detect extraneous material not detectable by the single filter methods heretofore employed, thereby giving more accurate test information.

A further object of the invention is to provide a double stage continuous type filter that is simple as to its parts, easy to operate and inexpensive to manufacture.

These and other objects and advantages of the invention are obtained by the filter of the invention which generally comprises means defining a conduit for a liquid substance to be tested and support means associated with the conduit means to guide at least two spaced removable filter elements into transverse position across the conduit.

The invention will be more particularly described with reference to the illustrative embodiments of the invention in which:

Fig. 1 is a perspective view of a two stage continuous filter embodying the principles of the invention employing continuous sheet filter mediums;

Fig. 2 is a fragmentary side elevation of the filter shown in Fig. 1;

Fig. 3 is a side elevation similar to Fig. 2 with a portion of the support tube broken away to show more clearly the arrangement of, and support elements for, the filter mediums;

Figs. 4 and 5 are fragmentary views of the double filter carrier;

Fig. 6 is a perspective view of a modified form of the filter of the invention showing a double stage individual filter carrier;

Fig. 7 is a fragmentary side elevation of a portion of the filter shown in Fig. 6;

Fig. 8 is a side elevation similar to Fig. 7 with a portion of the support tube broken away to show more clearly the filter stop and support screen; and Figs. 9 through 11 show double stage individual filter elements adapted to be used in the device shown in Figs. 6, 7 and 8.

With reference to the drawing and in particular to Figs. 1 through 5, 10 is a double stage continuous tape filter, generally comprising a funnel 12, funnel section 14, filter section 16, discharge section 18, filter roll 20 and filter roll support 22.

The funnel, funnel section, filter section, discharge section and filter roll support may be constructed of any suitable material such as metal, plastic or glass, or any combination of such materials. It is, however, advantageous to employ materials which are relatively inert such as stainless steels or glass to substantially eliminate corrosion and to facilitate keeping the device clean.

The filter section 16 in the illustrated form of the invention comprises a metallic coupling 24 provided with internally threaded upper and lower portions 26 and 28, extending substantially from the top and bottom of the coupling inwardly to a center portion 34, which separates a pair of transverse arcuate slots 30 and 32.

In the preferred embodiment, the center portion 34 has an inside diameter equal to that of the funnel and discharge sections 14 and 18. Within the filter section, a circular screen 36 is secured to the coupling at the top peripheral margin of the center portion 34, as more clearly shown in Figs. 3 and 5 of the drawings.

The lower end of funnel section 14 and the upper end of discharge section 18 are provided with threaded portions 38 and 40, respectively. The length of each of these threaded portions is such as to permit each section to be screwed into the coupling, to the top and bottom of the center portion 34, respectively.

A screen 42, similar to screen 36, is secured to the top peripheral margin of discharge section 18. These screens 36 and 42 as will be hereinafter described aid in supporting the two filter elements of the filter.

A filter roll support 22 is carried by the filter section 16, and comprises a band-like structure having sides 44 and 46 and an end member 48. The band is secured to the coupling 24, for example, by machine screws 50. Corresponding slots 52 and 54 are provided at one end of the support side members and are adapted to receive a compound roll of filter material, while at the other end a roller or pin 56 is journalled between the sides 44 and 46. This roller aids in keeping the filter elements separated after leaving the filter section of the device.

In operation, the sediment tester shown in Figs. 1 through 5 is assembled by screwing the funnel and discharge sections a substantial distance into the filter section 16. Next a roll of filter material is placed on the support 22. The roll consists of a compound winding of an upper or preliminary filter element 58 which may be of open mesh organdy material and a lower or standard filter element 60. The ends of tape filters 58 and 60 are fed through slots 30 and 32 of the filter section, respectively.

The lower tape filter is held tightly in place by screwing the discharge section 18 and its screen member 42 inwardly until the lower filter tape is held by screen 42 and the upper end of the discharge section against the bottom of the center portion 34 of the coupling. Similarly the preliminary filter tape 58 is secured between the upper end of center portion 34 and its screen 36 and the lower end of funnel section 14 by screwing the funnel section tightly into the coupling. The tester as assembled is placed on a milk can or other container which serves as a waste tank. The prepared sample is poured into the funnel, and where desired, a vacuum applied to the waste container. After filtering, the vacuum, if employed, is released, sections 14 and 18 of the filter are loosened and tapes 58 and 60 pulled through the slots 30 and 32 to a new position and again tightened in place. After each or several tests have been made, they are cut from the tapes and mounted in accordance with the ordinary procedure for mounting single tape test samples.

With reference to Figs. 6 through 11 of the drawings, there is shown a modified form of the invention comprising generally a double stage individual filter carrier having a funnel 112, funnel section 114, filter section 116, discharge section 118 and filter guide and stop 120.

The funnel, funnel section, filter section, discharge section and filter stop may be constructed of any suitable material as hereinbefore more fully described with reference to the continuous type sediment tester shown in Figs. 1 through 5 of the drawings.

The filter section 116 comprises a centrally flanged coupling 124 provided with internally threaded upper and lower portions 126 and 128, extending substantially from the top and bottom of the coupling inwardly to a transverse arcuous slot 130 in the central flange 132 of the coupling.

The lower end of funnel section 114 and the upper end of discharge section 118 are provided with threaded portions 138 and 140, respectively. The lengths of each of these threaded portions are such as to permit each section to be screwed into the coupling to the top and bottom of the slot 130.

A screen 142, adapted to aid in the support of the filter medium, is secured to the top peripheral margin of discharge section 118, as more clearly shown in Fig. 8 of the drawings.

The filter guide and stop 120 is carried, for example, by spring action by the filter section at the lower end of central flange 132.

One form of filter adapted to be used in the apparatus of the invention is shown in Figs. 9 through 11, Fig. 9 being a perspective view of the assembled filter, Fig. 10 a perspective view of the assembled filter in partially open aspect, and Fig. 11 an exploded sectional view of the elements of the filter in their assembled relationships. The filter therein shown comprises a cardboard or the like support 150 folded upon itself at 152 to form a support 154 for the preliminary filter element 156 which may be of open mesh organdy material and a heavy paper gasket or spacer 157 and a support 158 for the lower or standard filter element 160.

Centrally disposed in each support 154 and 158 and in the spacer 157 are holes 162, 163 and 164, respectively. The filter card is assembled by stapling, or securing by means of waterproof adhesive, the preliminary filter element 156 and the spacer 157 beneath the circular opening in support 154, and the standard filter element 160 beneath the circular opening in support 158, in the arrangement shown in Fig. 11. The unfolded end of the support card 150 may then be stapled together for convenience in handling.

In operation, the sediment tester shown in Figs. 6 through 8 is assembled by screwing the funnel section a substantial distance into the top of filter section 116 and the upper end of discharge section 118 into the lower portion of section 116 until the screen 142 is flush with the bottom of slot 130. Next a filter card is inserted into slot 130 with the preliminary filter element 156 upward until one end of card 150 engages the filter stops. The card with the filter elements attached is then held tightly in place by screwing the funnel section inwardly until the card is held between screen 142 and the lower end of the funnel section.

The tester as assembled is placed on a milk can or other container which serves as a waste tank. The prepared sample is poured into the funnel, and, where advantageous, a vacuum is applied to the waste container. After filtering, the vacuum, if employed, is released and section 114 of the filter is loosened and the filter card withdrawn.

From the foregoing description, it will be seen that a double stage filter, adapted to receive a relatively coarse filter element to remove larger particles, and a second standard filter element, is provided whereby the aims, objects and advantages of the invention are fully accomplished.

It will be evident that various modifications may be made in the construction of the device and in the form of the apparatus, and that ordinary single filter elements may be used with the device of the invention or that the continuous tape type and the individual card filters may be used interchangeably in each form of the invention. For example in the device shown in Figs. 1 through 5, a single filter element or tape or the double stage filter card 150 could be inserted in slot 30 of the filter section 16, and slot 32 closed by screwing the discharge section 18 inwardly against the bottom of the center portion 34 of the coupling.

We claim:

1. A sediment tester comprising a funnel section, a filter section, and a discharge section connected in axial alignment to form a single conduit, said filter section having two spaced transverse slots therethrough, said funnel section and said discharge section being longitudinally adjustable toward and away from the transverse slots in the filter section, support means carried by the filter section adjacent the transverse slots adapted to support a roll of filter material having two tapes in closely compound wound substantially spiral configuration, and transverse perforate filter support means extending across the filter section immediately below each of the transverse slots.

2. A sediment tester comprising a filter section having two spaced transverse slots therethrough, a funnel section and a discharge section threadably engaging the filter section and in axial alignment therewith to form a single conduit, whereby the funnel section and the discharge section are longitudinally adjustable toward and away from the transverse slots in the filter section, support means carried by the filter section adjacent the transverse slots adapted to support a roll of filter material having two tapes in closely compound wound substantially spiral configuration, and transverse perforate filter support means extending across the filter section immediately below each of the transverse slots.

3. A sediment tester comprising a funnel section, a filter section, and a discharge section connected in axial alignment to form a single conduit, support means carried by the filter section to guide a filter medium comprising at least two filter elements into transverse position across the filter section, said funnel section and said discharge section being longitudinally adjustable toward and away from the filter elements when in spaced transverse position across the filter section, and transverse perforate support means for the filter elements in the filter section.

References Cited in the file of this patent
UNITED STATES PATENTS

| Number | Name | Date |
| --- | --- | --- |
| 727,145 | Johnson | May 5, 1903 |
| 758,150 | Schilling | Apr. 26, 1904 |
| 794,631 | Milne | July 11, 1905 |
| 945,632 | Strahl | Jan. 4, 1910 |
| 1,139,513 | Gessner | May 18, 1915 |
| 1,307,677 | Konkle | June 24, 1919 |
| 1,606,647 | McCutcheon | Nov. 9, 1926 |
| 1,713,478 | Michel | May 14, 1929 |
| 1,720,384 | Smith | July 9, 1929 |
| 1,837,368 | Medin | Dec. 22, 1931 |
| 2,058,587 | Hinman | Oct. 27, 1936 |
| 2,177,060 | Drew | Oct. 24, 1939 |
| 2,225,984 | Erekson | Dec. 24, 1940 |
| 2,368,145 | Klazkin et al. | Jan. 30, 1945 |
| 2,488,726 | Judkins | Nov. 22, 1949 |
| 2,515,522 | Lucas | July 18, 1950 |